INVENTORS
ARTHUR G. BLOMQUIST
LUDOLPH LARSEN
MILTON C. NEUMAN
PALMER G. WERMAGER

BY Claude Funkhouser
ATTORNEY

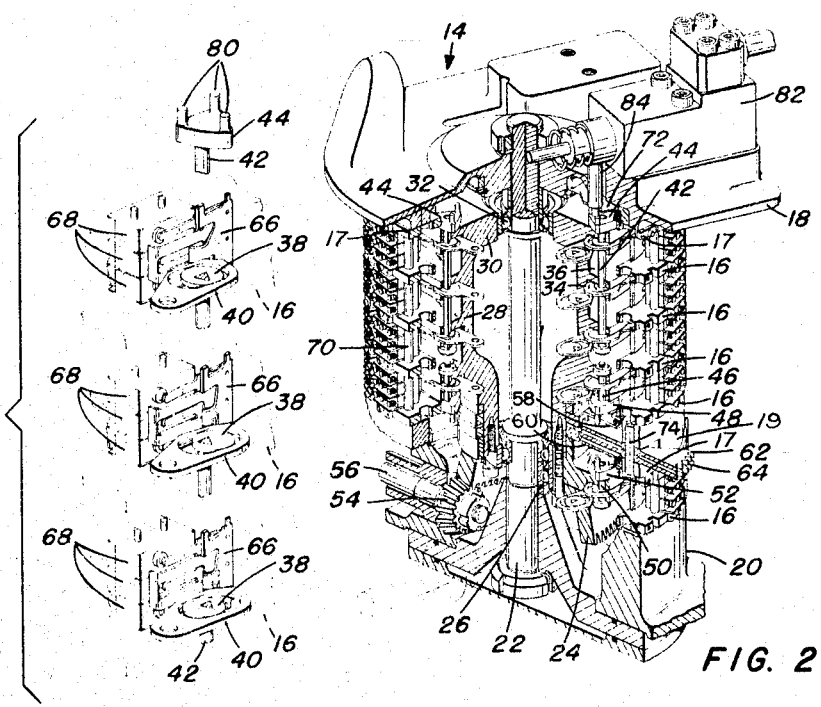
FIG. 3
FIG. 2
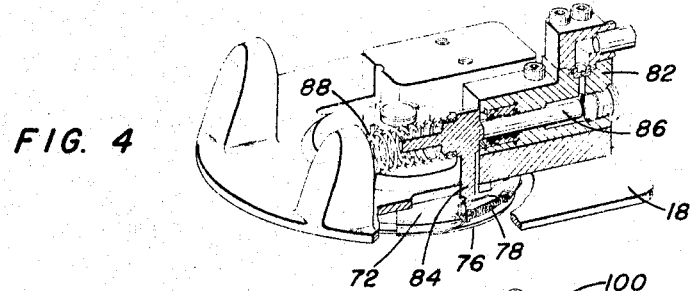
FIG. 4
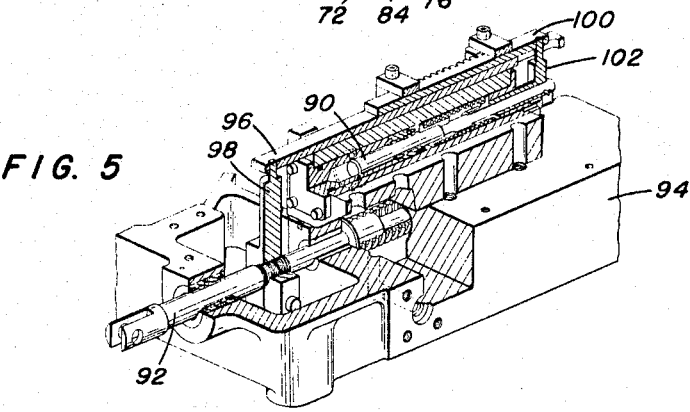
FIG. 5

United States Patent Office 3,274,348
Patented Sept. 20, 1966

3,274,348
LOAD STATUS INDICATOR
Arthur G. Blomquist, Golden Valley, Ludolph Larsen, Minneapolis, Milton C. Neuman, Champlin, and Palmer G. Wermager, Robbinsdale, Minn., assignors, by mesne assignments, to the United States of America as represented by the Secretary of the Navy
Filed May 22, 1962, Ser. No. 197,565
7 Claims. (Cl. 200—5)

This invention relates generally to registers, and more particularly it pertains to a load status indicator for a cylindrical storage and dispensing magazine.

In a rapid access and delivery missile type storage magazine for modern weapons, it is necessary to record and continuously balance the inventory of missiles.

Typical armament stores a full complement of twenty missiles in ready service condition in a dispensing magazine ring. Sometimes, as many as three types of missiles may be stored intermixed on one ring. In addition, dud or inoperative missiles may also be included in the complement.

Accordingly, it is an object of the present invention to provide a load status recorder for continuously indicating missile type and condition in a plurality of stations in a magazine.

Another object of this invention is to provide a load status indicator of simple design and compact size so that electrical circuitry for monitoring the complement of stored missiles can be concentrated in a small area.

These and other objects and attendant advantages of the present invention will become more readily apparent and understood from the following detailed specification and accompanying drawings in which:

FIG. 2 is a diametric view of a switch and cam actuator assembly for the load status recorder of FIG. 1;

FIG. 3 is an enlarged exploded diametric view showing a portion of three tiers of switches controlled by one triple head cam shaft;

FIG. 4 is a diametric view of the top actuator mechanism; and

FIG. 5 is an enlarged diametric view of the lower actuator mechanism.

Figure 1:
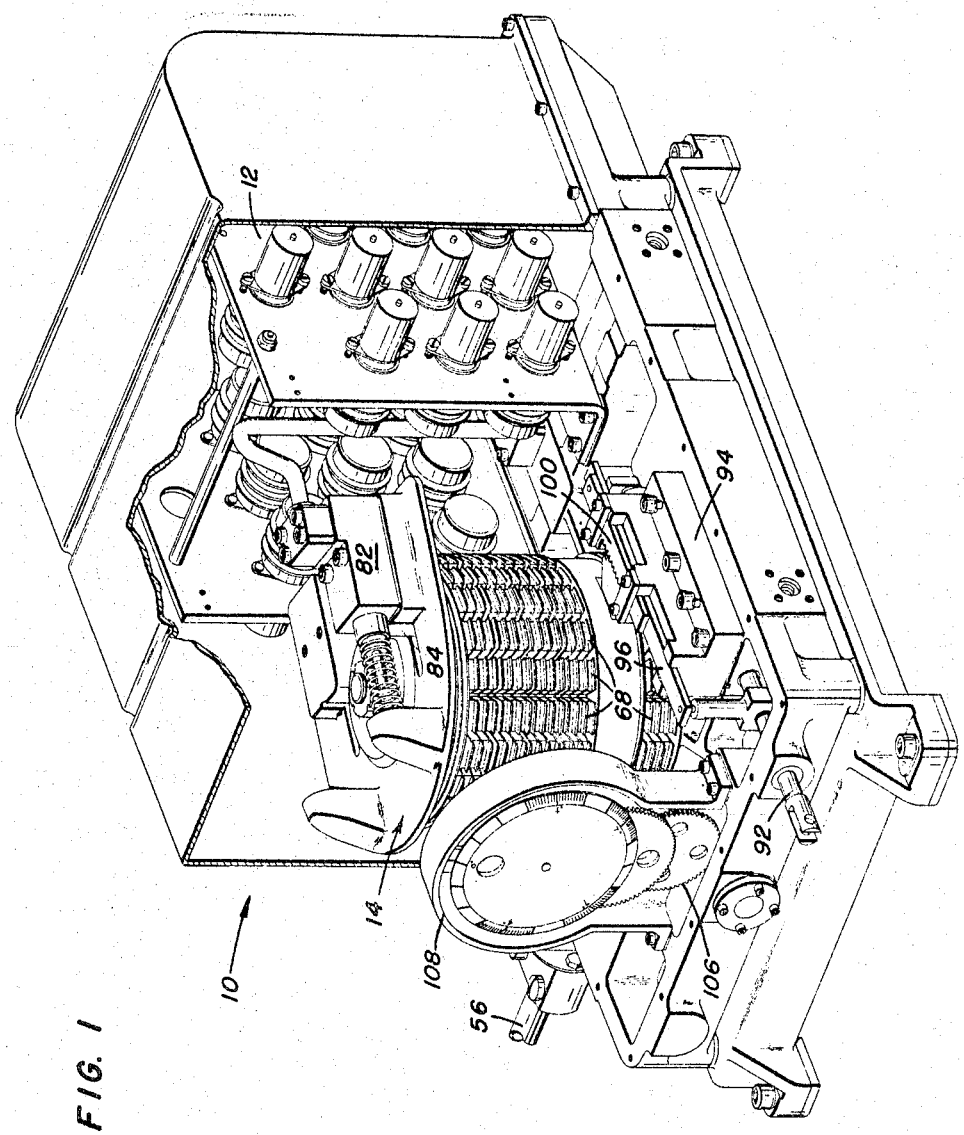
FIG. 1 is a diametric view of a load status recorder incorporating features of this invention.

The load status recorder of this invention is primarily designed to represent a missile magazine as disclosed, for example, in co-pending application Serial No. 265,581 filed March 7, 1963, of common assignment, now Patent No. 3,228,295, in order to indicate missile type and condition at any and all stations in the magazine and to relay the information to control panels in the form of interlock switch and visual light indications.

For purposes of illustration a magazine in the form of a ready service ring, of the type disclosed in the aforementioned co-pending application for a missile launching system, has been chosen, and one embodiment of the invention is a miniature representation of the large storage magazine ring.

As illustrated in FIG. 1, this load status recorder designated by reference numeral 10, is composed of two basic sections, namely, a relay board assembly 12 and a cam actuator assembly 14.

As shown best in FIG. 2, the cam actuator assembly 14 consists of an inner rotating cam cage 28 and an outer stationary framework arranged co-axially with the cam cage and comprises spaced rings 16 stacked between a cover 18 and a base 20.

A fixed shaft 22 is mounted vertically to the base 20 and arranged co-axially to these rings 16. A bevel gear 24 is mounted low on the shaft 22 on a ball bearing assembly 26. The cylindrical cam cage 28 is secured co-axially with the shaft 22 to the top of the bevel gear 24, with its upper end plate 30 housing a ball bearing assembly 32 which is mounted upon shaft 22.

The cam cage 28 is provided with five grooves 34 around its circumference. Upon a common radius circle which is arranged co-axially with shaft 22, twenty equally spaced holes 36 are vertically bored and pass through all five grooves 34. An eccentric disk cam 38 with a flat cam plate 40 therearound, are positioned in each groove 34 at each hole 36.

From the top of case 28, twenty shafts 42, each headed with a triple head cam 44, pass downwardly through the disk cams 38 and the cam plates 40 in the top three grooves 34 and are secured to these cams 38 such that on each cam shaft 42 the three eccentric cams 38 are displaced relative to each other by 120 degrees of rotation as best shown in FIG. 3.

Lower down on cage 28, a short cam shaft 46 having a single headed cam 48 on its lower end is similarly located in each of the twenty holes 36 and it passes through the cam plate 40 and the eccentric disk cam 38 positioned with a fourth groove 34 at each hole 36.

Another short cam shaft 50, provided with a single head cam 52 secured to its top, is positioned in the lowermost portion of each of the twenty holes 36 and is passed through the cam plate 40 and the eccentric disk cam 38 residing in the fifth groove 34.

The cam cage 28 is rotated about the shaft 22 by means of a small bevel gear 54, which mates with the previously mentioned bevel gear 24. The shaft 56, mounting bevel gear 54, extends horizontally out of the base 20.

Two plates 58 and 60, having integral gear segments on their peripheries, are mounted on a reduced diameter on the cam cage 28 between the two lower sets of short cam shafts 46 and 50 and their sets of cam plates 40.

A plate 72, positioned adjacent to and above the triple head cams 44, is mounted to a diameter of the cover 18. These three plates 58, 60, and 72 are free to rotate co-axially with the shaft 22 to a limited degree by either hydraulic or mechanical means to be described.

Each ring 16, consisting of the outer stationary framework, mounts twenty spring switch actuators 66 and adjacent to each of these actuators are mounted twenty miniature sensitive switches 68 as best shown in FIG. 3.

Thus, each of the twenty switch actuators 66 on each of the five rings 16 is opposite a cam plate 40 of the cam cage 28. The concentric arrangement of the cam cage 28 and the framework of stationary rings 16 and switches 68 is maintained at the top of the cam actuator assembly 14 by the cover 18 which mounts on the center shaft 22 and is secured by dowel rods and spacers 70 passing downwardly through the rings 16 into the base 20 as illustrated best in FIG. 2.

The upper portion of the base 20 is used for mounting two double gear segments 62 and 64 on a common shaft 74, as best shown in FIGS. 1 and 2. The inner gear teeth of each segment 62 and 64 mate, respectively, with the gear teeth of the mentioned plates 58 and 60.

As the cam cage 28 is rotated in singular or multiple increments of 18 degrees in either clockwise or counterclockwise direction, all twenty triple head cam shafts 42 controlling the upper three sets of cams 38 and the cam plates 40 and the two lower sets of single head short cam shafts 46 and 50 all remain stationary about their own axis except at a "Station One" position where it is possible to rotate any and all three cam shafts 42, 46, and 50 which are on the same vertical centerline.

This "Station One" position is fixed on a vertical line passing through the shaft 74 which mounts the gear segments 62 and 64. At all other stations around the periphery of the cam actuator assembly 14, the sets of cam heads 44, 48, and 52 are prevented from turning about their own axis by bearing against the inner edges of the rings 16. The three sides of the heads of these cams 44, 48, and 52 have a radius generated from the center of the cam cage 28 which forms the bearing surface.

At "Station One" position, three restraining rings 16 have a relief radius cut from their inside edges large enough to allow the triangular heads of the cams 44, 48, and 52 to be rotated about their own axis at this station only. The rotation of the triple headed cam shaft 42 at "Station One" is limited by an actuator plate 76 on which is mounted a spring loaded latch 78, shown best in FIG. 4. The actuator plate 76 is located on top of the uppermost ring 16, and is moved radially by the plate 72 which is connected to the top cover 18 as shown best in FIG. 4.

Upon rotation of the plate 72, the actuator plate 76 is driven to a predetermined position where the end of the latch 78 will fall into a relief cut into the cover 18. At this point, a projection of the latch 78 will drop behind one of three pins 80 of the triple head cam 44, shown in FIG. 3, and rotate it until the pin 80 enters a slot in the actuator plate 76 which will complete the rotation of the camhead.

The return of the plate 72 and actuator plate 76 to the original starting position will not effect the position of the cam 44, but will lock it and prevent any further rotation until again actuated. Actuation is in one direction only, the cam 44 being rotated 120 degrees each time the actuator plate 76 is moved the predetermined amount. Actuation and rotation of the cam 44 is unlimited.

An arrangement similar to that at "Station One" may be positioned elsewhere on the recorder e.g., "Station Eleven," corresponding to a similar station on the missile launcher ready service ring, specifically for purposes of unloading the launcher by strike down apparatus and procedures defined in the aforementioned application Serial No. 265,581. The desired information for this "strike-down" function is the availability of an empty tray suitable to receive the missile-booster combination from the launcher.

"Station Eleven" would thus be provided with proper relief radii removed from rings 16 to permit cam actuation, an appropriate latch on the actuator plate and a hydraulic piston block appropriately arranged on cover 18 as, for example, on pad 19.

Each of the two lower sets of cams 48 and 52 are likewise individually controlled by the plates 58 and 60, respectively, and associated similar latched actuator plates (not shown). However, the heads of the cams 48 and 52 are single, that is, only one pin 80 extends therefrom, with two latches 78 being positioned on each actuator plate.

From a neutral or rest position, the actuator plate moves a predetermined distance while this movement takes place, the associated latch engages the single pin 80 of the cam 48 (or cam 52) and rotates it a total distance of 120 degrees. The return stroke to neutral will not cause any reverse actuation to take place. Any further number of actuations will not rotate the cams 48 and 52 beyond the original 120 degrees which is unlike the operation of the previously mentioned upper triple head cams 44.

To re-position the cam 48 (or cam 52) to its original position, movement of the actuator plate 76 in the opposite direction from neutral must take place. The second latch 78, mentioned above, on the actuator plate 76 is used for engaging the single pin 80 and returning the cam 48 (or cam 52) to its original position. The movement of these actuator plates and the rotation of the cams 48 and 52 is the same in both directions. The total rotary movement is 120 degrees from one position to the opposite position.

A hydraulic piston block 82 is mounted on the top cover 18 for actuation of the triple head cams 44 as shown in FIG. 4. A short pin 84 projecting at right angles from the plunger 86 connects to the plate 72 at the top of the cam cage 28. A compression spring 88 keeps the plunger 86 seated in a depressed position. Hydraulic pressure on the end of plunger 86 will move pin 84 and therefore plate 72, which, through the latch 78, will rotate the triple head cam 44 and cam shaft.

Actuation of the lower two sets of cam shafts 46 and 50 is performed by a hydraulically operated piston 90 and by a mechanically actuated shaft 92 housed in a piston block 94 shown in FIG. 1 and FIG. 5.

The gear rack 96 is actuated through an arm 98 when external linear force is applied to the spring-centered shaft 92. This gear rack 96 meshes with the lower gear segment 64 in the cam actuator assembly 14. When the gear segment 64 rotates, the previously described plate and actuator plate arrangement rotates and actuates the lowermost cam shaft 50. The spring-centered hydraulic piston 90 connects to a top gear rack 100 through an arm 102 extending at right angles to the piston 90 and attached thereto.

This top gear rack 100 meshes with the upper gear segment 62 mounted in the cam actuator assembly 14. When this gear segment 62 rotates, the previously mentioned plate and actuator arrangement associated therewith actuates the single headed short cam shaft 46 in the area next to the bottom.

An externally mounted solenoid valve (not shown), ports pressure to both piston blocks 94 and 82 but only to one at a time. The combination assembly of the two gear racks 96 and 100 is made to have independent movement in one direction and to work in unison in the opposite direction.

Movement of the mechanical shaft 92 in an inward direction is independent of the movement of the hydraulic piston 90 in the same direction. When the mechanical shaft 92 is moved in an outward direction by an amount sufficient to take up the clearance in the gear rack 96, contact is made with the hydraulic piston 90 and the gear rack 100 and both will move a predetermined distance.

Hydraulic pressures and mechanical movements for actuating pistons 86, 90 and 92 are initiated by sensing means (not shown) associated with the magazine. Typical initiators for this purpose is the stall-loaded indicator disclosed by A. J. Stanton et al. in U.S. Patent No. 2,745,317.

The triple head cam shafts 42, shown in FIG. 3, in the top of the cam actuator assembly 14 provide for one item of information, such as missile type. The top tier of these cam shafts 42 can store, for example, X-type missile indication; with the second tier storing Y-type missile indication, and the third tier may furnish Z-type missile indication. The two single-headed short cam shafts 46 and 50 provide, for example, dud indication in the fourth tier, and load-no-load indication in the fifth or bottom tier.

A gear train 106 associated with the cam cage 28 turns a dial 108 which in visible through a cut-out in the cover of the load-status recorder (FIG. 1).

The gear train is proportioned so that one revolution of the dial represents one indexing rotation of the ready service ring (equal to 18 degrees of rotation). The dial on the load-status recorder is divided into 18 graduations with a zero (0) indication and numerals "4" and "7" engraved on the graduations in both clockwise and counterclockwise direction from the "0" mark.

The 7-degree marks indicate the number of degrees from the final index position when the dud and the loaded-empty indication should appear on the control panels. The 4-degree marks indicate the number of degrees from the index position when the missile type should appear on the control panels. The important consideration is the difference between the angles at which the missile-type indication and the other indications are made.

The loaded-empty indication must be made three degrees before the missile-type indication because, when searching for a certain tray type, it must first be determined whether a tray is loaded before the tray type becomes of any concern. Since the ready service ring power source must start decelerating two degrees before reaching zero in order to stop in time, and allowance has to be made for switch and valve reaction time, the four degree limit is provided as the last stop for meeting the desired tray-type and load-condition requirements. Once the indexing has proceeded to within the four-degree limit, the ready service ring will not decelerate, but will proceed to the next station.

Thus, any rotary storage magazine connected in one-to-one ratio to the drive shaft 56 of the cam cage 28 can be "read-out" in its entirety even while rotating. Switch positions at each station may be indicated at a control center by means of a suitable display of lights, gauges and the like as are deemed appropriate. The information stored can be modified at one station successively for the entire complement of storage elements, by hydraulic, or mechanical means or both. Further, the information can be transmitted remotely to any distance by electric wires and used for automatic operation of the storage magazine through associated interlocks, relays and the like as will occur to those skilled in the art.

Obviously, many modifications and variations of the present invention are possible in light of the above teachings. It is, therefore, to be understood that within the scope of the appended claims the invention may be practiced otherwise than as specifically described.

What is claimed is:

1. A device for indicating the contents of a storage area comprising a plurality of groups of switches each group thereof corresponding to a predetermined portion of said storage area, a switch actuator for each switch, a cam assembly including a plurality of positionable cams selectively engageable with said actuators, and mechanical and hydraulic means on said device for transmitting motions of storage area monitoring apparatus to said cams whereby the presence and condition of objects stored in a predetermined portion of said storage area is indicated by resultant switch actuation.

2. The device as defined in claim 1 further comprising top and bottom covers with a shaft extending therebetween, said cam assembly having a circular columnar frame rotatably mounted on said shaft, said frame having said positionable cams mounted on its periphery, and said switches being mounted between said covers in a circular array concentric with said frame for sequential actuation by said cams as said frame is rotated.

3. A mechanical memory device comprising a plurality of spaced stations around a circular path, each of said stations having a plurality of positionable cams, and a bank of spaced switches at each of said stations corresponding to said spaced cams and conditionally operable thereby, whereby information may be stored at each of said stations in the form of cam positions and whereby said information may be indicated at each of said stations by the operation of said switches.

4. A mechanical memory apparatus for indicating the type and condition of missiles at all stations of a missile magazine ready service ring comprising a cam assembly having a rotatable frame, a series of spaced positionable cams mounted on said frame corresponding to said missile stations for movement in a circular path, a plurality of stacked switches mounted along the periphery of said circular path for sequential actuation by said positionable cams, and cam actuating means for positioning said cams in predetermined setting in response to hydraulic and mechanical indications of missile status at a corresponding station on said ready service ring whereby said switch actuation conditioned by said predetermined cam settings is an indication of missile status on said ring.

5. A device for indicating the load status of a storage magazine having a plurality of article receiving and storing stations, said device comprising a plurality of spaced independently positionable cams, said cams being arranged in groups corresponding to said storage stations, means operably engaging a selected group of cams for positioning said cams in predetermined attitudes relative to the type of article in a selected storage station, an array of switches conditionally actuated by said cams for indicating cam positions thereby indicating the type of article in said selected storage station, and a rotatable columnar frame, said groups of cams being mounted on said frame for movement along a circular path, said switches being mounted along the periphery of said path for sequential actuation by said cams.

6. A device for indicating the load status of a storage magazine having a plurality of article receiving and storing stations, said device comprising a plurality of spaced independently positionable cams, said cams being arranged in groups corresponding to said storage stations, means operably engaging a selected group of cams for positioning said cams in predetermined attitudes relative to the type of article in a selected storage station, and an array of switches conditionally actuated by said cams for indicating cam positions thereby indicating the type of article in said selected storage station, said cam positioning means comprising an actuator plate engageable with predetermined cams, a gear segment operably connected to said plate, and a gear rack engageable with said gear segment and movable in response to hydraulically and mechanically actuted piston motion thereby moving said gear segment and actuator plate and actuating said cam.

7. A device for indicating the load status of a storage magazine having a plurality of article receiving and storing stations, said device comprising a plurality of spaced independently positionable cams, said cams being arranged in groups corresponding to said storage stations, means operably engaging a selected group of cams for positioning said cams in predetermined attitudes relative to the type of article in a selected storage station, an array or switches conditionally actuated by said cams for indicating cam positions thereby indicating the type of article in said selected storage station, and a top cover enclosing said cams and switches, said cam positioning means including a rotatable actuator plate mounted on said cover, a latch mounted on said plate for engaging and positioning predetermined cams, hydraulic piston means mounted on said cover and having a portion operably engaging said plate whereby movement of said piston rotates said plate and latch thereby effecting said cam actuation.

References Cited by the Examiner

UNITED STATES PATENTS

| | | | |
|---|---|---|---|
| 847,157 | 3/1907 | Brown et al. | 340—23 |
| 2,298,939 | 10/1942 | Griffiths et al. | 340—23 |
| 2,745,317 | 5/1956 | Stanton et al. | 89—1.7 |
| 2,948,881 | 8/1960 | Berti et al. | 340—23 |
| 3,024,453 | 3/1962 | Ransom et al. | 89—1 |
| 3,049,056 | 8/1962 | Evans et al. | 89—1 |

BENJAMIN A. BORCHELT, *Primary Examiner.*

SAMUEL FEINBERG, *Examiner.*

L. L. HALLACHER, W. C. ROCH,
*Assistant Examiners.*